Aug. 10, 1926.

F. HENEKA 1,595,192

RESILIENT WHEEL

Filed July 2, 1925

INVENTOR.
Fred Heneka.
BY
ATTORNEYS.

Patented Aug. 10, 1926.

1,595,192

UNITED STATES PATENT OFFICE.

FRED HENEKA, OF SAN FRANCISCO, CALIFORNIA.

RESILIENT WHEEL.

Application filed July 2, 1925. Serial No. 41,210.

This invention relates to an improvement in resilient wheels for vehicles, whereby to permit the use of solid or cushion tires without interfering with the desired resiliency of the support.

The wheel is constructed of the usual rim and hub, with interconnecting spring spokes, each made up of a pair of sections of arcuate form, the radius of one section being greater than that of the other, in order to provide a compensation in spring action to insure a proper yielding of the wheel under strain without permitting distorting stresses.

The invention is illustrated in the accompanying drawings, in which.

Figure 1:
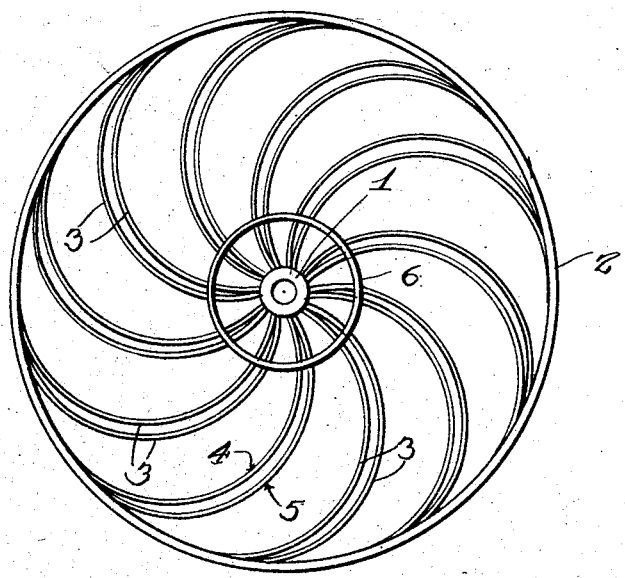
Fig. 1 is a view in side elevation of the improved wheel.
Figure 2:
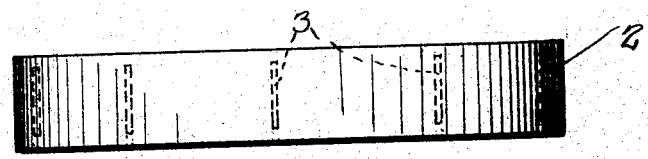
Fig. 2 is an edge view of the same.

In the drawings, 1 represents the hub of the wheel, and 2 the rim, the latter being formed in any appropriate manner for the reception of a solid or cushion tire. The rim and hub are connected by what may be termed spokes 3, each of arcuate form, and each made up of two sections 4 and 5. These sections are formed on different radii and are connected together at the hub juncture and at the rim. If desired, and as preferred, the spokes are connected by a band 6 concentric with and spaced a short distance from the hub.

It is of course to be understood that the spokes constitute the resilient member of the wheel, and that in action, as the rim is slightly flattened under the load, the tendency is to bend the spokes directly in line with or adjacent the load point. This load strain is equally directed to both sections of the spokes, but as these sections are of different curvature, it is apparent that initially the smaller section will resist the load but that under unusual load strain, the larger section also will be flexed to a point to materially assist in the load resistance.

It is of course to be understood that the spokes may be secured to the hub and rim in any appropriate manner, for example, being inserted in openings in the hub and secured to the rim by rivets. The spokes pass through the band 6 and may, if desired, be welded thereto. No particular fastening means at these points is illustrated, it being contemplated that any conventional manner of securing the parts together may be used.

Claim:

A spring wheel including a hub, a rim, and spring spokes connecting the hub and rim, each of the spokes being made up of two similar members in contact at the hub and at the rim the contacting ends thereof at the latter merging into the curvature of the rim, the members being otherwise spaced apart throughout their full lengths and being normally formed on differently curved outlines, the merging of the members into the rim constituting a bridge to cause the load strain to be directed at the same terminal point of each of the members and to differently affect the respective members intermediate their terminal points, whereby the resistance of either member is through its terminal connections transmitted to both members.

In testimony whereof I affix my signature.

FRED HENEKA.